US007940909B2

(12) United States Patent
Yan

(10) Patent No.: US 7,940,909 B2
(45) Date of Patent: May 10, 2011

(54) METHOD AND SYSTEM FOR REWARDING RING BACK TONE, DONOR PLATFORM, AND CUSTOM RING BACK TONE PLATFORM

(75) Inventor: Yongfu Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 505 days.

(21) Appl. No.: 12/105,820

(22) Filed: Apr. 18, 2008

(65) Prior Publication Data

US 2008/0198977 A1 Aug. 21, 2008

Related U.S. Application Data

(63) Continuation of application No. PCT/CN2007/000341, filed on Jan. 31, 2007.

(30) Foreign Application Priority Data

Mar. 3, 2006 (CN) .......................... 2006 1 0034145

(51) Int. Cl.
 *H04M 3/42* (2006.01)
(52) U.S. Cl. .............. 379/201.05; 370/352; 379/114.05; 379/142.15; 379/201.12; 379/372; 455/414.1; 455/418; 455/419; 455/420; 709/201; 709/220; 709/229; 717/172; 717/173; 717/177; 717/178
(58) Field of Classification Search .......... 370/351–356; 379/88.13, 88.17, 114.05, 142.15, 201.05, 379/201.12, 372–376.02; 455/414.1, 418–420; 709/201–203, 220–222, 229; 717/172, 173, 717/177, 178; 725/32
See application file for complete search history.

(56) References Cited

U.S. PATENT DOCUMENTS 7,123,696 B2 * 10/2006 Lowe .......................... 379/88.16
7,171,200 B2 * 1/2007 No et al. ....................... 455/433
(Continued)

FOREIGN PATENT DOCUMENTS

CA 2523909 11/2004
(Continued)

OTHER PUBLICATIONS

International Search Report for International Application No. PCT/CN2007/000341, dated Apr. 29, 2007, with English translation.

(Continued)

*Primary Examiner* — Hemant Patel
(74) *Attorney, Agent, or Firm* — Harness, Dickey & Pierce, P.L.C.

(57) ABSTRACT

The present disclosure describes a method for rewarding an RBT, including selecting an RBT and initiating an RBT reward via a third-party platform in which a donator exists; processing an RBT reward request from a third-party platform, and downloading the RBT selected by the donator to a customized RBT library of the rewarded party when a predetermine condition is met. The CRBT platform may also return reward result information (Successful or Failed) to the third-party platform; the third-party platform receives the reward result information and charges the donator for the rewarded RBT. If the donator is charged successfully, the rewarded party is notified that the rewarded RBT is received; if the donator is charged unsuccessfully, the downloaded RBT is deleted from the customized RBT library of the rewarded party. The disclosure further describes a device and a system for implementing the method.

18 Claims, 4 Drawing Sheets

U.S. PATENT DOCUMENTS

| | | | |
|---|---|---|---|
| 7,512,421 B2 * | 3/2009 | Kim et al. | 455/567 |
| 7,613,287 B1 * | 11/2009 | Stifelman et al. | 379/215.01 |
| 7,623,642 B2 * | 11/2009 | Izquierdo Gonzalez | 379/201.01 |
| 2004/0114732 A1 * | 6/2004 | Choe et al. | 379/88.17 |
| 2004/0120494 A1 * | 6/2004 | Jiang et al. | 379/210.01 |
| 2005/0117726 A1 * | 6/2005 | DeMent et al. | 379/142.01 |
| 2005/0163300 A1 * | 7/2005 | Kawakami et al. | 379/207.16 |
| 2005/0207555 A1 * | 9/2005 | Lee et al. | 379/207.16 |
| 2006/0023862 A1 * | 2/2006 | Sutcliffe | 379/257 |
| 2006/0109970 A1 * | 5/2006 | Shim et al. | 379/207.16 |
| 2006/0147012 A1 * | 7/2006 | Moody et al. | 379/207.16 |
| 2006/0147017 A1 * | 7/2006 | Moody et al. | 379/211.02 |
| 2006/0153355 A1 * | 7/2006 | Wang et al. | 379/215.01 |
| 2006/0210033 A1 * | 9/2006 | Grech et al. | 379/88.19 |
| 2006/0285532 A1 * | 12/2006 | Radziewicz et al. | 370/352 |
| 2007/0003047 A1 * | 1/2007 | Batni et al. | 379/215.01 |
| 2007/0077918 A1 * | 4/2007 | Nguyen et al. | 455/414.1 |
| 2007/0224973 A1 * | 9/2007 | Park et al. | 455/412.2 |

FOREIGN PATENT DOCUMENTS

| | | |
|---|---|---|
| CN | 1520211 A | 8/2004 |
| CN | 1523904 A | 8/2004 |
| CN | 1705333 A | 12/2005 |
| WO | 2005004453 A1 | 1/2005 |
| WO | WO-2005006721 | 1/2005 |
| WO | WO-2005051015 | 6/2005 |

OTHER PUBLICATIONS

Extended European Search Report regarding Application No. 07702233.3 dated Apr. 2, 2009.

Russian Office Action regarding Application No. 2008136543/09(046754). Translation provided by ARS-Patent IP Law Firm.

PCT Written Opinion regarding Application No. PCT/CN2007/000341 dated May 17, 2007. Translation provided by Huawei Technologies Co., Ltd.

* cited by examiner

METHOD AND SYSTEM FOR REWARDING RING BACK TONE, DONOR PLATFORM, AND CUSTOM RING BACK TONE PLATFORM

CROSS-REFERENCE TO RELATED APPLICATIONS

This application is a continuation of International Application No. PCT/CN2007/000341, filed Jan. 31, 2007. This application claims the benefit of Chinese Application No. 200610034145.9, filed Mar. 3, 2006. The disclosures of the above applications are incorporated herein by reference.

FIELD

The present disclosure relates to Custom Ring Back Tone (CRBT) service in the voice communication, and in particular, to a method and a system for rewarding a Ring Back Tone (RBT), a reward party platform and a CRBT platform.

BACKGROUND

The statements in this section merely provide background information related to the present disclosure and may not constitute prior art.

Custom Ring Back Tone (CRBT) service is a service providing a piece of melody, a greeting, or a piece of recorded or synthesized greeting voice customized by a called user for a calling user, rather than playing the common Ring Back Tone (RBT). After a user applies to activate a CRBT service, the user may configure a CRBT. When the user is called, a piece of customized music or record is played to the calling user in place of a traditional RBT. A service makes the operator in a leading position in the customized service and differential service provided to users, and the enterprise image of the operator may be promoted. On the other hand, the service is attractive to personal users because the network capability is fully opened to a user when the user enjoys the customized service. At present, more and more telephone users activate CRBT service, and the users may want to reward the RBT with their friends while the users enjoy the wonderful RBT. The RBT reward function is needed. Generally, the RBT reward means that a user will be charged for rewarding an RBT, which is favored by the user or a rewarded user, to the rewarded user, and the rewarded user may configure the RBT as its own RBT after the RBT is rewarded successfully.

At present, the RBT reward is mainly implemented in two solutions. 1) An RBT is rewarded to a user of the same Custom Ring Back Tone Platform (CRBT platform) via a WEB page. 2) An RBT is rewarded to a user of the same CRBT platform via an Interactive Voice Response (IVR) voice process.

SUMMARY

Various embodiments of the disclosure provide a method for rewarding an RBT, including:

receiving, by a CRBT platform, an RBT reward request sent from a third-party platform in which a donator exists; and performing, by the CRBT platform, an RBT reward operation according to information in the RBT reward request.

Various embodiments of the disclosure further provide a system for rewarding an RBT, including a CRBT platform and a third-party platform in which a donator exists;

the third-party platform is adapted to provide RBT information and send an RBT reward request to the CRBT platform according to a selection of the donator;

the CRBT platform is adapted to perform an RBT reward operation according to information in the RBT reward request received.

Various embodiments of the disclosure further provide a donor platform, and the donor platform is a third-party platform in which an RBT donator exists, and the donor platform includes:

an RBT information obtaining unit, adapted to obtain related RBT information from a CRBT platform and providing RBT information obtained to the donator;

a reward request generating unit, adapted to generate a reward request according to a reward instruction of the donator; and an RBT reward interface, adapted to send the reward request which instructs the CRBT platform to perform an RBT reward operation, to the CRBT platform.

Various embodiments of the disclosure further provide a CRBT platform, including a reward request receiving unit, an RBT reward unit and an RBT reward interface;

the reward request receiving unit is adapted to receive an RBT reward request from a third-party platform via the RBT reward interface; and the reward request processing unit is adapted to perform an RBT reward operation according to information in the RBT reward request.

In the method, system and platform for rewarding an RBT according to Various embodiments of the disclosure, by opening an RBT reward interface in a CRBT platform, a non-CRBT user may reward an RBT to a CRBT user, a non-CRBT user may initiate an RBT reward in the CRBT platform or other third-party platform, and a CRBT user may perform functions, such as RBT reward, across CRBT platforms. By such functions, a user may easily reward an RBT, and thus the CRBT service is developed.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The above two technical solutions for implementing the RBT reward in the prior art support CRBT users in which the donator and the rewarded party belong to the same CRBT platform. Moreover, in the solutions of the prior art, the donator can be charged via a CRBT platform, and the reward mode is limited to WEB, IVR and Short Message (SM).

Various embodiments of the disclosure provide a method for rewarding an RBT. The method for rewarding the RBT according to one embodiment of the disclosure will now be illustrated in conjunction with two modes.

Figure 1A:
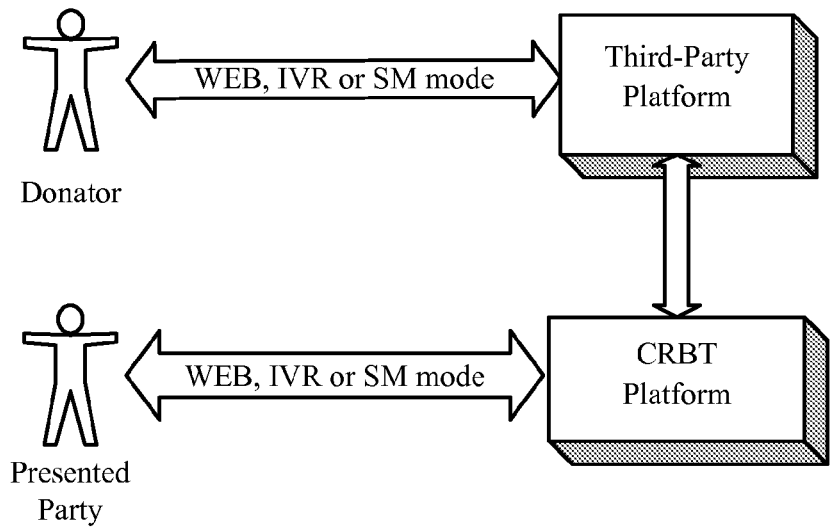
FIG. 1a is a schematic diagram of the first embodiment of the method for rewarding an RBT according to the disclosure.
Figure 1B:
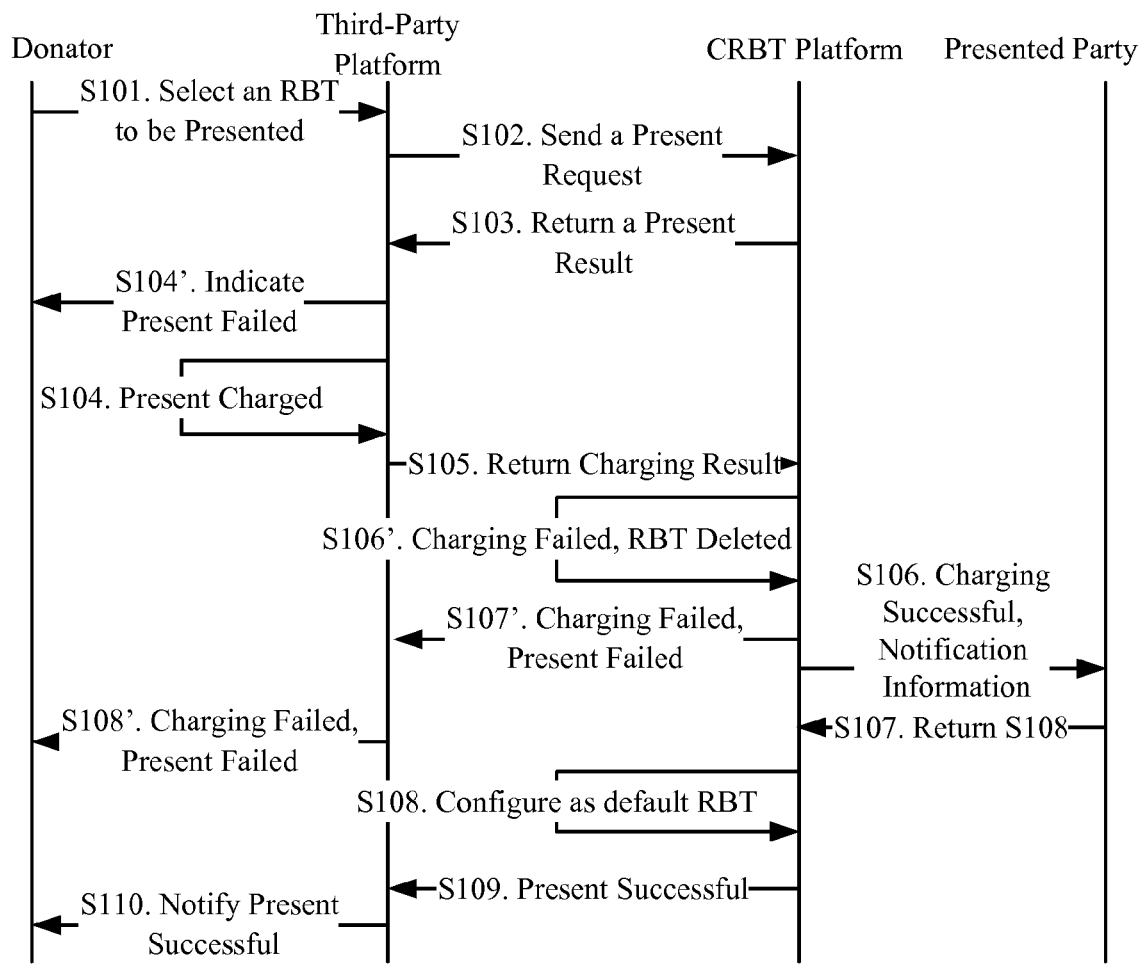
FIG. 1b is a flow chart of the first embodiment of the method for rewarding an RBT according to the disclosure.

FIG. 1a and FIG. 1b are schematic diagram and signaling flow chart of the first embodiment of the method for rewarding an RBT according to one embodiment of the disclosure respectively.

In the embodiment shown in FIG. 1a and FIG. 1b, a donator is a non-CRBT user, and a reward initiating party is a third-party platform which is a non-CRBT platform. In the mode, the third-party platform is required to be able to further implement a charging function for the RBT reward of the donator based on the processing for the RBT reward request. The specific process is as shown in FIG. 1b.

In Step S101, the donator selects an RBT on a third-party platform in the mode of WEB, IVR or SM, designates a rewarded party and initiates an RBT reward.

The third-party platform is a non-CRBT platform the third-party platform may be any other platform which supports an RBT reward interface and further has a charging function, such as, SP web site, management system of the operator (such as System 97). The third-party platform has a service association with a CRBT platform. The RBT information can also be browsed on the third-party platform, and a data of CRBT user may also be configured on the third-party platform. The third-party platform usually is based on the CRBT platform, and an operation may be accomplished by invoking various interfaces provided by the CRBT platform.

In Step S102, the third-party platform sends an RBT reward request, which carries parameter information such as RBT donator, rewarded party and rewarded RBT code, to the CRBT platform via a predefined RBT reward interface.

The CRBT platform receives the RBT reward request from the third-party platform via an RBT reward interface and activates an RBT rewarding unit to perform the RBT reward operation.

The RBT reward operation process of the RBT rewarding unit mainly includes: determining whether the RBT exists according to the RBT code; determining whether the rewarded party is a CRBT user; and determining whether the customized RBT library of the rewarded party can receive a new RBT. If at least one of the above conditions is met, the RBT selected by the donator is downloaded to the customized RBT library of the rewarded party.

In the method mentioned above, the RBT reward operation is implemented. To further charge the donator and notify the rewarded party to configure a customized RBT, the CRBT platform may return reward result information (Successful or Failed) to the third-party platform.

In Step S103, the third-party platform receives the reward result information. In Step S104, the third-party platform determines whether the reward is successful. If the reward is successful, the third-party platform charges the donator for the rewarded RBT. Then, in Step S105, the third-party platform returns a charging result to the CRBT platform.

If the reward result information received by the third-party platform is Failed, in Step S104', the third-party platform notifies the donator that the reward operation is failed, and illustrates a specific reason.

In Step S106, after the CRBT platform receives the charging result information from the third-party platform, the CRBT platform determines that the donator is charged successfully. If the donator is charged successfully, the CRBT platform notifies the rewarded party that the rewarded RBT is received and queries the rewarded party whether to configure the rewarded RBT as a default RBT.

If the donator is charged unsuccessfully, then in Step S106', the CRBT platform deletes the RBT which is downloaded to the customized RBT library of the rewarded party in the Step S103; and in Step S107', the CRBT platform returns information of reward failure caused by the charging failure to the third-party platform. Then, in Step S108', the third-party platform notifies the donator that the RBT reward operation is failed.

In Step S107, after the rewarded party receives an RBT reward notification from the CRBT platform, the rewarded party determines whether to configure the rewarded RBT as a default RBT and returns a response message.

In Step S108, the CRBT platform receives the response message from the rewarded party. If the rewarded party determines to configure the RBT as the default RBT, the CRBT platform configures the RBT as the default RBT of the rewarded party.

In Step S109, the CRBT platform returns a reward success message to the third-party platform.

In Step S110, after the third-party platform receives the reward success message returned by the CRBT platform, the third-party platform notifies the donator that the RBT reward is successful.

Figure 2A:
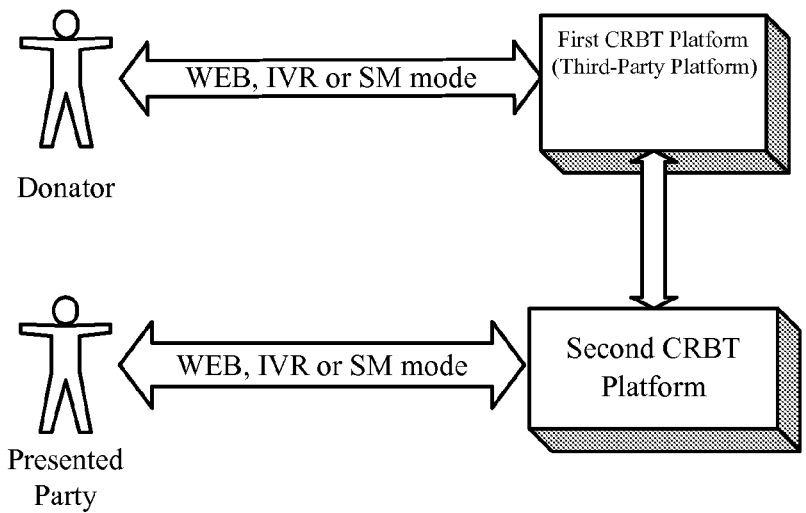
FIG. 2a is a schematic diagram of the second embodiment of the method for rewarding an RBT according to the disclosure.
Figure 2B:
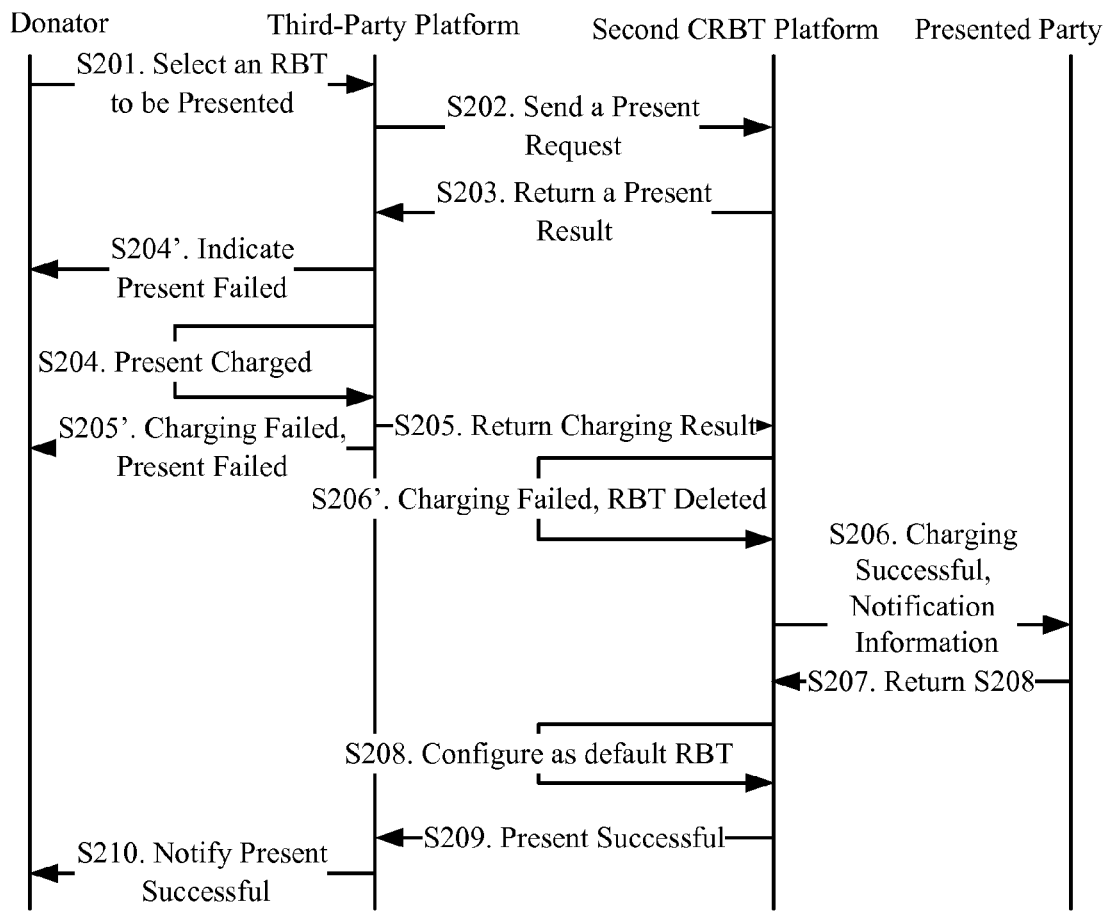
FIG. 2b is a flow chart of the second embodiment of the method for rewarding an RBT according to the disclosure.

FIG. 2a and FIG. 2b are schematic diagram and signaling flow chart of the second embodiment of the method for rewarding an RBT according to the disclosure respectively.

In the embodiment shown in FIG. 2a and FIG. 2b, the donator is a CRBT user, the reward initiating party is a CRBT platform (i.e., the first CRBT platform), and the rewarded party is a CRBT user which belongs to another CRBT platform (i.e., the second CRBT platform). In this mode, it is required that the donator is a CRBT user and the first CRBT platform can further implement a charging function on the RBT reward of the donator on the basis of the RBT reward operation processing function. The specific process is as shown in FIG. 23b.

In Step S201, the donator selects an RBT on the first CRBT platform (for example, via WEB site, IVR or SM, etc., of the CRBT platform), designates the rewarded party and initiates an RBT reward.

In Step S202, the first CRBT platform sends an RBT reward request, which carries parameter information such as RBT donator, rewarded party, rewarded RBT code, to the second CRBT platform to which the rewarded party belongs via a predefined RBT reward interface.

After the second CRBT platform receives the RBT reward request via an RBT reward interface, the second CRBT platform activates an RBT rewarding module to perform the RBT reward operation.

The RBT reward operation process of the RBT rewarding module mainly includes: determining whether the RBT exist according to the RBT code, determining whether the rewarded party is a CRBT user, and determining whether the customized RBT library of the rewarded party can receive a new RBT. If at least one of the above conditions is met, the second CRBT platform downloads the RBT selected by the donator to the customized RBT library of the rewarded party.

In the method mentioned above, the RBT reward operation is implemented. To further charge the donator and notify the rewarded party to configure a customized RBT, the second CRBT platform may return reward result information (Successful or Failed) to the first CRBT platform.

In Step S203, the first CRBT platform receives the reward result information. In Step S204, the first CRBT platform determines that the reward is successful, the first CRBT platform charges the donator for the rewarded RBT.

If the reward is failed, in Step S204', the first CRBT platform notifies the donator that the reward operation is failed, and illustrates the specific reason.

In Step S205, after the donator is charged, the first CRBT platform sends charging result information to the second CRBT platform via a predefined interface.

Moreover, in Step S205', if the donator is charged unsuccessfully, the first CRBT platform notifies the donator that the reward operation is failed due to the charging failure.

In Step S206, after the second CRBT platform receives the charging result information, the second CRBT platform determines that the donator is charged successfully, the second CRBT platform notifies the rewarded party that the rewarded RBT is received and queries the rewarded party whether to configure the rewarded RBT as a default RBT.

If the donator is charged unsuccessfully, in Step S206', the second CRBT platform deletes the RBT which is downloaded to the customized RBT library of the rewarded party in the Step S203.

In Step S207, after the rewarded party receives the RBT reward notification from the second CRBT platform, the rewarded party determines whether to configure the RBT as a default RBT and returns a response message.

In Step S208, the second CRBT platform receives the response message returned by the rewarded party. If the rewarded party determines to configure the RBT as the default RBT, the second CRBT platform configures the RBT as the default RBT of the rewarded party.

In Step S209, the second CRBT platform returns a reward success message to the first CRBT platform.

In Step S210, after the first CRBT platform receives the reward success message returned by the second CRBT platform, the first CRBT platform notifies the donator that the RBT reward is successful.

In both of the two RBT reward modes mentioned above, a reward request is processed first, an RBT is downloaded, and then the donator is charged, and if the donator is charged unsuccessfully, the rewarded RBT which has been downloaded will be deleted. However, embodiments of the disclosure are not limited hereto. According to the above content, those skilled in the art may understand that various embodiments of the disclosure may also employ a technical solution in which the donator is charged first, a reward request is processed and an RBT is downloaded, and if the download of the RBT is failed, the charged fee will be refunded.

In the method for rewarding an RBT according to one embodiment of the disclosure, the donator may select one or more RBTs from any platform which supports RBT reward interface and reward the RBTs to the rewarded party. Moreover, according to the support situation of the CRBT platform service, the donator may also select one or more RBT packages or RBT boxes and reward them to the rewarded party, and the corresponding rewarding and charging processes are similar to those of the FIG. 1b and FIG. 2b. After any platform which supports the RBT reward interface provides the RBT package or RBT box code selected by the donator to the CRBT platform in which the rewarded party exists, the CRBT platform of the rewarded party downloads the RBT package or RBT box corresponding to the RBT package or RBT box code to a customized RBT library of the rewarded party. If the donator is charged unsuccessfully, the RBT package or RBT box is deleted correspondingly.

In a method for rewarding an RBT according to various embodiments of the disclosure, the donator may designate one or more rewarded parties at the same time via the platform which supports the RBT reward interface, and the platform which supports the RBT reward interface initiates a reward request to the CRBT platform of each rewarded party one by one. The processing for each rewarded party is similar to that of FIG. 1b and FIG. 2b.

The method for rewarding an RBT according to various embodiments of the disclosure has been described in detail. The components and operating principle of an RBT system for implementing the above method will be specifically described.

Figure 3:
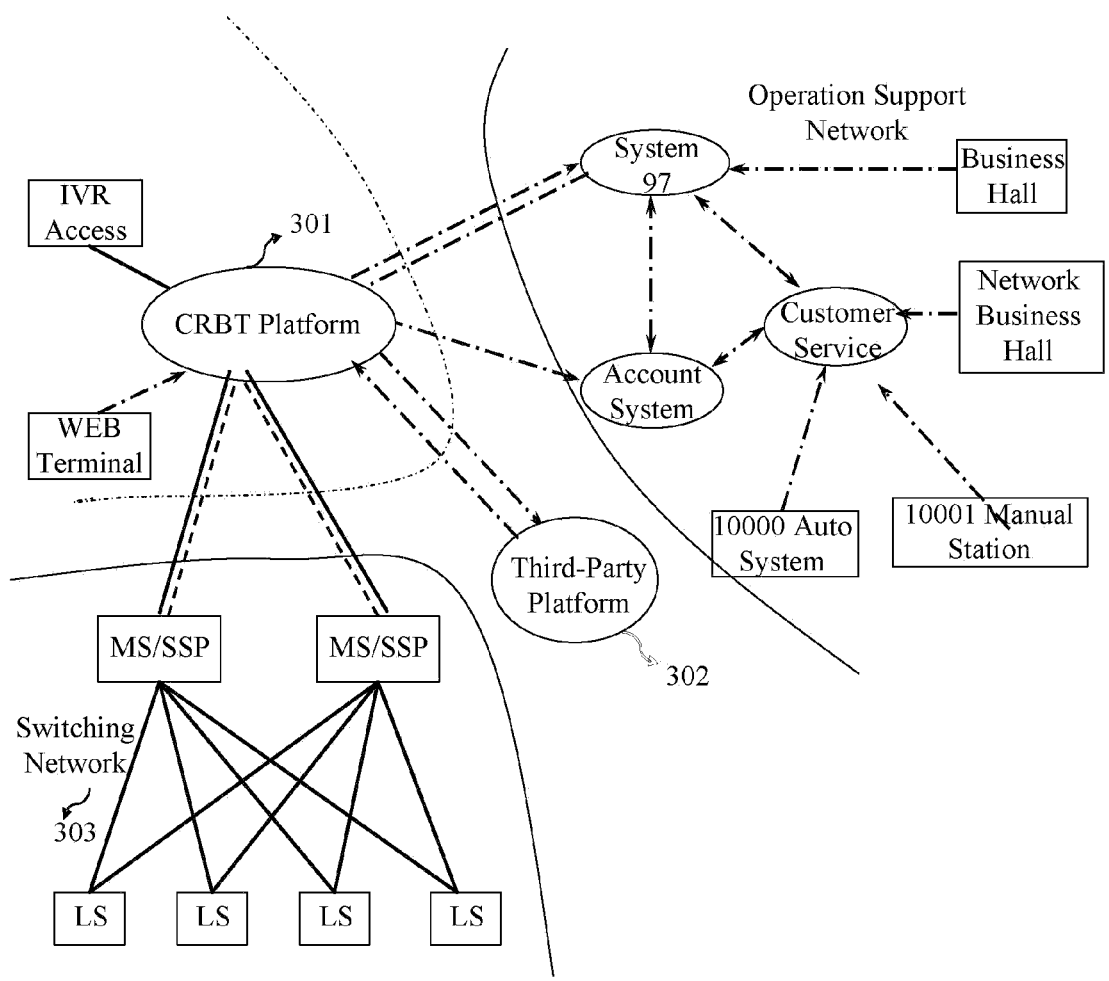
FIG. 3 is a structural representation of the system for rewarding an RBT according to various embodiments of the disclosure.

FIG. 3 is a structural representation of a system for rewarding an RBT in accordance with the method for rewarding an RBT according to various embodiments of the disclosure. The system for rewarding an RBT includes: CRBT platform 301 and third-party platform 302 in which the RBT donator exists.

The third-party platform is adapted to provide RBT information and send an RBT reward request to the CRBT platform via an RBT reward interface according to the selection of the donator; and the CRBT platform is adapted to perform the RBT reward operation according to the information in the RBT reward request received.

It should be noted that the third-party platform may be any other platform which supports RBT reward interface and further has a charging function, for example, management system (such as System 97) of the operator in an operation support network, or the third-party platform may be a CRBT platform other than the above CRBT platform. The CRBT platform may not only perform the RBT reward operation, but also perform other functions such as RBT management and RBT play.

The system implements the functions of reward processing and RBT download in accordance with the method in various embodiments of the disclosure. However, during the implementation, the system may also include switching network 303 adapted to perform a lower-layer network switching and provide a CRBT user with an access to a CRBT platform.

To further implement the charging function, after the system carries out the RBT reward operation, the CRBT platform is further adapted to return reward result information to the third-party platform; and if the CRBT platform determines that the donator is charged unsuccessfully according to the charging result returned by the third-party platform, the RBT downloaded to the customized RBT library of the rewarded party via the RBT reward operation will be deleted.

After the reward result information sent from the CRBT platform is received, the third-party platform is further adapted to:

charge the donator for the rewarded RBT after the third-party platform determines that the reward is successful according to the reward result information sent from the CRBT platform, and notify the CRBT platform of the charging result.

In various embodiments of the disclosure, the charging function may also be performed by the third-party platform before the RBT operation is performed. Therefore, the third-party platform is further adapted to:

charge the donator for the rewarded RBT before the RBT reward operation is performed.

After the RBT reward operation is performed, the CRBT platform is further adapted to:

return reward result information to the third-party platform.

After receiving the reward result information sent from the CRBT platform is received, the third-party platform is further adapted to:

determine that the reward is failed according to the reward result information returned by the CRBT platform and refund the fee charged on the donator for the rewarded RBT.

Figure 4:
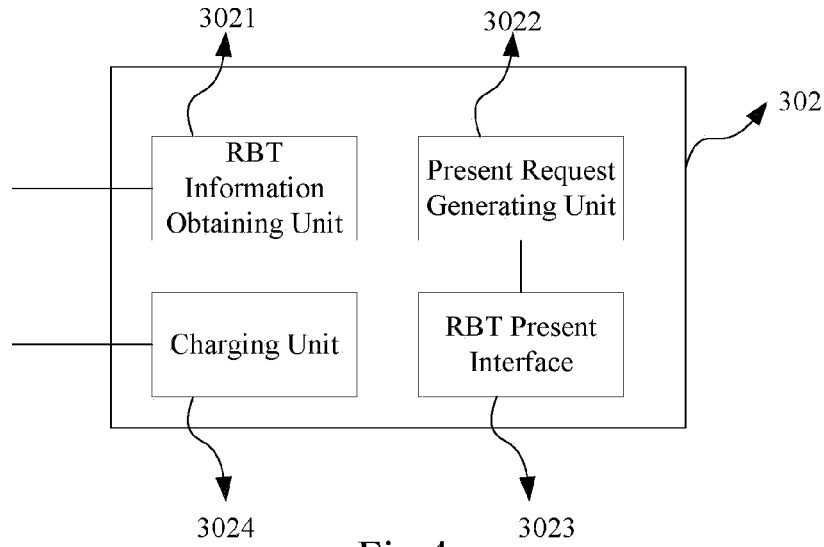
FIG. 4 is a structural representation of the donor platform according to various embodiments of the disclosure.

Various embodiments of the disclosure further provide a donor platform. As shown in FIG. 4, the donor platform is a third-party platform in which an RBT donator exists, including an RBT information obtaining unit 3021, reward request generating unit 3022 and an RBT reward interface 3023.

The RBT information obtaining unit is adapted to obtain related RBT information from a CRBT platform and provide the related RBT information for the donator.

The reward request generating unit is adapted to generate a corresponding reward request according to a reward instruction of the donator; and the RBT reward interface is adapted to send the reward request, which instructs the CRBT platform to perform the RBT reward operation, to the CRBT platform.

The donor platform mentioned above implements the function of processing a reward request in accordance with the method in various embodiments of the disclosure. To further separate the charging function from the CRBT platform and charge the donator in a third-party platform, the donor platform further includes charging unit 3024, and the charging unit 3024 may charge the donator after the CRBT platform performs the RBT reward operation, or charge the donator before the CRBT platform performs the RBT reward operation.

If the charging unit charges the donator after the CRBT platform performs the RBT reward operation, the charging unit is adapted to:

charge the donator for the rewarded RBT after determining that the reward is successful according to the reward result information sent from the CRBT platform, and notify the CRBT platform of the charging result so as to instruct the CRBT platform to delete the RBT downloaded to the customized RBT library of the rewarded party via the RBT reward operation when the donator is charged unsuccessfully.

If the charging unit charges the donator before the CRBT platform performs the RBT reward operation, the charging unit is adapted to:

charge the donator for the rewarded RBT before the RBT reward operation is performed, and refund the fee charged on the donator for the rewarded RBT if determining that the reward is failed according to the reward result returned by the CRBT platform.

Figure 5:
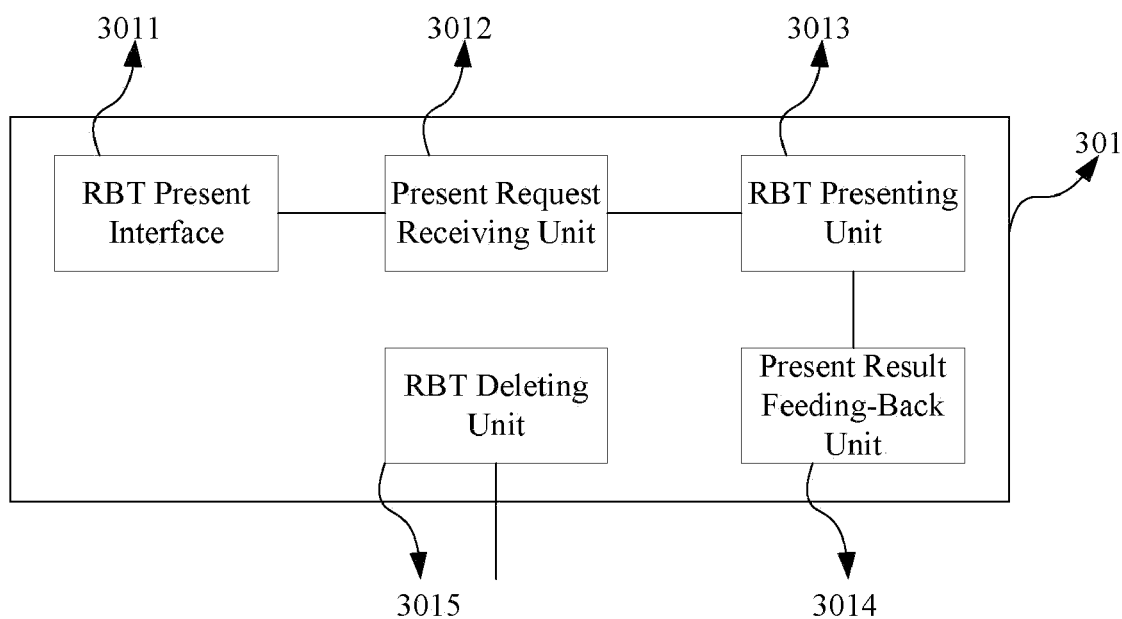
FIG. 5 is a structural representation of the CRBT platform according to various embodiments of the disclosure.

Various embodiments of the disclosure further provide a CRBT platform. As shown in FIG. 5, the platform includes an RBT reward interface 3011, a reward request receiving unit 3012 and an RBT rewarding unit 3013.

The reward request receiving unit is adapted to receive an RBT reward request from a third-party platform via an RBT reward interface.

The RBT rewarding unit is adapted to perform the RBT reward operation according to the information in the reward request.

The above platform has implemented the RBT reward function. In order to guarantee that the third-party platform accurately charges the donator, the CRBT platform further includes a reward result feeding-back unit 3014.

The reward result feeding-back unit is adapted to:

return reward result information to the third-party platform after the RBT reward operation is performed.

To avoid that the CRBT platform continues to send an RBT reward notification to the rewarded party when the donator is charged unsuccessfully, the further includes an RBT deleting unit 3015.

The RBT deleting unit is adapted to:

delete the RBT downloaded to the customized RBT library of the rewarded party via the RBT reward operation if determining that the donator is charged unsuccessfully according to the charging result returned by the third-party platform.

The RBT reward interface defined by the CRBT platform may employ the following form:

portal address: port/interfaces/delivertoneanyway.do

For example, an interface address may be:

http://Portal_IP:Port/interfaces/delivertoneanyway.do?operatoraccount=sp&operatorpwd=sppwd&phonenumber=075512345678&sendphonenumber=0755289744418&tonecode=111111111111&operator=14&type=0

The meaning of each parameter in the address is shown in the following Table I, and the parameters may be input in HTTP, POST or GET mode. The POST mode may be preferred.

TABLE I

| Serial Number | Field Name | Type | Meaning | Value |
|---|---|---|---|---|
| 1 | operatoraccount | String[3~6] | Account for logging in a Portal | 3-6 bit character string (alphabet and number) |
| 2 | operatorpwd | String[1~6] | Password for logging in a Portal | 1-6 bit character string (alphabet and number) |
| 3 | phonenumber | String[1~20] | Number of the Donator | 1-20 bit digital character string |
| 4 | sendphonenumber | String[1~20] | Number of the Rewarded Party | 1-20 bit digital character string |
| 5 | tonecode | String[11, 12] | RBT Code, the long code is accepted | 11 or 12 bit digital character string |
| 6 | operator | String[2] | operator flag (0: portal; 1: ussd; 2: wap; 3: smp; 4: SM; 5: IVR; 6: Customer Service; 7: SMAP; 12: PUSH; 13: CBGPGateway; 14: SP) | 1-2 bit digital character string |
| 7 | type | String[1] | Type of RBT Reward | "0"-content reward The parameter is |

TABLE I-continued

| Serial Number | Field Name | Type | Meaning | Value |
|---|---|---|---|---|
| | | | | reserved for a future extension. |

The values returned during performing the RBT reward operation via the interface are shown in the following Table II. When other codes are returned or no value is returned, it is indicated an RBT PORTAL internal error occurs.

TABLE II

| Value | Meaning |
|---|---|
| 0 | Reward Success |
| 1 | RBT Not Exist |
| 2 | Rewarded Party Has Downloaded the RBT |
| 3 | Personal RBT Library of the Rewarded Party Is Full |
| 4 | Rewarded-Party User Is Not a Multimedia RBT User |
| 5 | Input Parameter Error |
| 6 | RBT Expired, Unable to Be Rewarded |
| 7 | Unallowed to Reward an RBT to Oneself |
| 8 | Unknown Error |

What is claimed is:

1. A method for rewarding a Ring Back Tone (RBT), comprising:
receiving, by a Custom Ring Back Tone (CRBT) platform, an RBT reward request, wherein the RBT reward request is sent by a third-party platform;
performing, by the CRBT platform, an RBT reward operation according to the RBT reward request;
wherein, the performing the RBT reward operation comprises:
determining, by the CRBT platform, a configured RBT reward condition is met according to the information in the RBT reward request, an RBT is downloaded to a customized RBT library of a rewarded party.

2. The method according to claim 1, further comprising:
charging, by the third-party platform, a donator according to a reward result after determining that the reward operation is successful, wherein the reward result is returned by the CRBT platform after performing the RBT reward operation.

3. The method according to claim 2, further comprising:
receiving, by the CRBT platform, a charging result sent by the third-party platform;
determining, by the CRBT platform, the donator is charged unsuccessfully according to the charging result received, and
deleting the RBT downloaded to the customized RBT library of the rewarded party.

4. The method according to claim 1, further comprising:
charging, by the third-party platform, a donator for the rewarded RBT before performing the RBT reward operation.

5. The method according to claim 1, wherein, the third-party platform is a CRBT platform or a non-CRBT platform.

6. The method according to claim 1, wherein, determining the configured RBT reward condition comprises:
determining the RBT to be rewarded exists according to an RBT code carried in the RBT reward request; and/or
determining the rewarded party is a CRBT user according to rewarded party information carried in the RBT reward request; and/or
determining the customized RBT library of the rewarded party is able to receive a new RBT according to the rewarded party information carried in the RBT reward request.

7. The method according to claim 1, further comprising:
configuring, by a rewarded party, the RBT downloaded as a default RBT and returning a selection result to the CRBT platform; and
configuring, by the CRBT platform, the RBT as the default RBT of the rewarded party according to the selection result received.

8. A system for rewarding a Ring Back Tone (RBT), comprising a third-party platform adapted to receive an RBT reward request, provide RBT information and send the RBT reward request to a Custom Ring Back Tone (CRBT) platform;
wherein the CRBT platform is adapted to perform an RBT reward operation according to the RBT reward request;
wherein performing the RBT reward operation comprises: determine a configured RBT reward condition is met according to the information in the RBT reward request, an RBT is downloaded to a customized RBT library of a rewarded party.

9. The system according to claim 8, wherein:
the CRBT platform is further adapted to return a reward result to the third-party platform after the RBT reward operation is performed; and
the third-party platform is further adapted to charge a donator for the rewarded RBT after determining that the RBT reward operation is successful according to the reward result sent from the CRBT platform.

10. The system according to claim 9, wherein:
the third-party platform is further adapted to notify the CRBT platform of a charging result; and
the CRBT platform is further adapted to delete the RBT downloaded to the customized RBT library of the rewarded party when determining that the donator is charged unsuccessfully according to the charging result returned by the third-party platform.

11. The system according to claim 8, wherein, the third-party platform is further adapted to charge a donator for the rewarded RBT before the RBT reward operation is performed.

12. The system according to claim 8, wherein, the third-party platform is a CRBT platform or a non-CRBT platform.

13. A platform, comprising:
a Ring Back Tone (RBT) information obtaining unit, adapted to obtain RBT information from a Custom Ring Back Tone (CRBT) platform and provide a donator with the RBT information;
a reward request generating unit, adapted to generate a reward request; and
an RBT reward unit, adapted to send the reward request instructing the CRBT platform to perform an RBT reward operation;

a charging unit, adapted to charge the donator for a rewarded RBT after determining that the RBT reward operation is successful according to a reward result sent from the CRBT platform, and notify the CRBT platform of a charging result so as to instruct the CRBT platform to delete the RBT downloaded to a customized RBT library of a rewarded party via the RBT reward operation when the donator is charged unsuccessfully.

14. The platform according to claim 13, further comprising: a charging unit, adapted to charge the donator for the rewarded RBT before the RBT reward operation is performed.

15. The platform according to claim 13, wherein, the third-party platform is a CRBT platform or a non-CRBT platform.

16. A Custom Ring Back Tone (CRBT) platform, comprising a reward request receiving unit adapted to receive an Ring Back tone (RBT) reward request from a third-party platform; and a reward request processing unit adapted to perform an RBT reward operation according to information of the RBT reward request; wherein perform the RBT reward operation comprises: determine a configured RBT reward condition is met according to the information in the RBT reward request, an RBT is downloaded to a customized RBT library of a rewarded party.

17. The CRBT platform according to claim 16, further comprising a reward result feeding-back unit adapted to return reward result information to the third-party platform after the RBT reward operation is performed.

18. The CRBT platform according to claim 16, further comprising an RBT deleting unit adapted to delete the RBT downloaded to the customized RBT library of the rewarded party when determining that a donator is charged unsuccessfully according to a charging result returned by the third-party platform.

* * * * *